United States Patent [19]

Malvido et al.

[11] Patent Number: 5,447,742
[45] Date of Patent: Sep. 5, 1995

[54] HIGH TEMPERATURE/SHORT TIME PROCESS FOR THE PRODUCTION OF LIME COOKED CORN DERIVATIVES

[76] Inventors: Oscar F. Malvido; Arturo F. Malvido, both of Bosques del Comendador 56, Bosques de la Herradura, Huixquilucan, Mexico

[21] Appl. No.: 248,007

[22] Filed: May 24, 1994

[51] Int. Cl.$^6$ .............................................. A23L 1/10
[52] U.S. Cl. .................... 426/626; 426/455; 426/456; 426/459; 426/463
[58] Field of Search ............... 426/626, 455, 456, 459, 426/463

[56] References Cited

U.S. PATENT DOCUMENTS

| | | |
|---|---|---|
| 2,584,893 | 2/1952 | Lloyd . |
| 3,083,103 | 3/1963 | Anderson et al. . |
| 3,404,986 | 10/1968 | Wimmer et al. . |
| 3,730,732 | 5/1973 | Rubio . |
| 4,250,802 | 2/1981 | Rubio . |
| 4,513,018 | 4/1985 | Rubio .............................. 426/626 X |
| 4,594,260 | 6/1986 | Vaqueiro ........................ 426/626 X |
| 5,176,931 | 1/1993 | Herbster ......................... 426/626 X |

FOREIGN PATENT DOCUMENTS 125285  2/1978  Mexico .

OTHER PUBLICATIONS

Bressani et al., Agricultural and Food Chemistry (1958), vol. 6, pp. 770–778.
Thesis of Maria Cristina Vaqueiro Garibay at the Sciences College, National Autonomous University of Mexico, 1969, in Spanish with English language translation.
Molina, et al., J. of Food Science (1977), vol. 42, pp. 1432–1434.
Bazua, et al., J. of Food Science (1979), vol. 44, pp. 940–941.

Primary Examiner—Helen Pratt
Attorney, Agent, or Firm—Beveridge, DeGrandi, Weilacher & Young

[57] ABSTRACT

A process for obtaining a dry lime pre-cooked corn grain, stable for storage at room temperature involving (a) mixing corn and water in a pressurized container at a temperature of 15° to 35° to form a corn-water mixture; (b) adding an aqueous lime solution to the corn-water mixture to form a corn-water-lime mixture having a pH of 11 to 122 (c) heating, by adding steam, the corn-water-lime mixture at a rate of 1.5° to 6° C. per minute until a lime cooking temperature of the corn-water-lime mixture is reached; (d) lime cooking the corn-water-lime mixture at a lime cooking temperature of at least 85° to no more than 100° C. for 5 to 20 minutes to form lime pre-cooked corn and depressuring the container over a period of 4 to 10 minutes; and (i) drying the lime pre-cooked corn wherein the temperature of the lime pre-cooked corn is less than or equal to 70° C. and optionally packing the lime pre-cooked corn, (ii) hydrating the lime pre-cooked corn within 3 to 4 hours of step (d) by adding water to the lime-precooked corn at a corn:water ratio of 1:0.5 to 1:0.7 at a temperature of 20° to 70° C., or (iii) milling the lime pre-cooked corn to form flour and drying the flour wherein the temperature of the flour is less than or equal to 70° C.

16 Claims, 1 Drawing Sheet

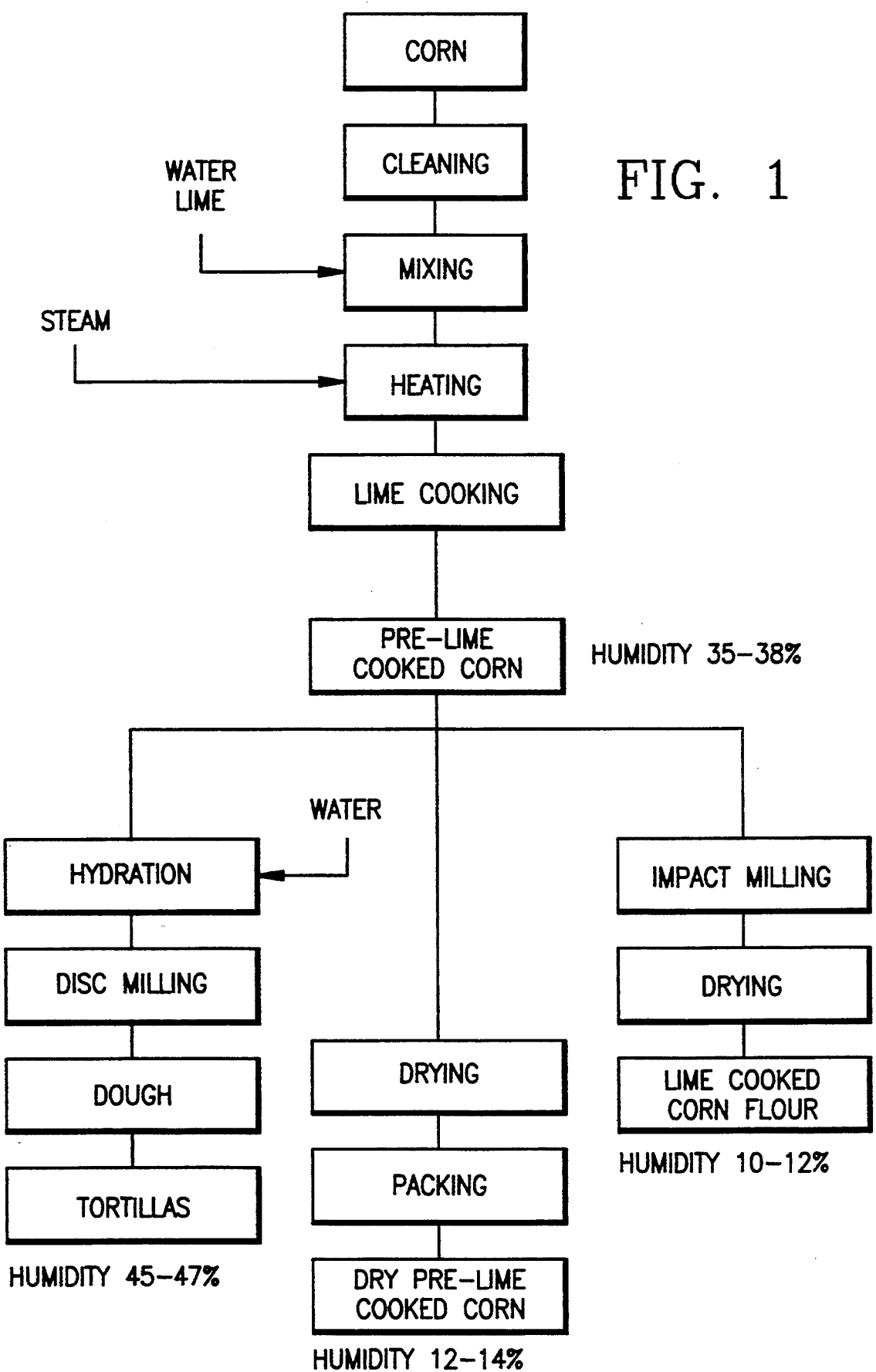

HIGH TEMPERATURE/SHORT TIME PROCESS FOR THE PRODUCTION OF LIME COOKED CORN DERIVATIVES

INTRODUCTION AND BACKGROUND

In Mexico tortillas are a product of great consumption in every house, no matter the socioeconomic level of the population. This product is mainly made from lime cooked corn that in mills and tortilla shops is transformed into corn dough or "masa" and tortillas and into instant corn flour that upon water addition gives corn dough and tortillas.

Tortilla production from lime cooked ground corn or from instant corn flour results in two highly pollutant industries, as the obtaining of intermediate products generates effluents and emissions with a strong environmental impact.

Therefore, it was considered important to carry out the development of a process allowing the production of dry lime cooked corn, instant corn flour and tortillas characterized by considerable reduction of effluents and emissions, retaining corn nutrients, and production of intermediate and final products with excellent quality.

TRANSFORMATION PROCEDURES APPLIED TO CORN FOR HUMAN CONSUMPTION

Among the processes used to make corn grain suitable for human consumption, those applied to this cereal for the manufacture of a great diversity of foodstuffs are countless. Each country and even each region thereof has its own particular way of using this grain in its daily nourishment.

The traditional process starts by steeping corn for 12 to 14 hours in water previously brought to boil with lime (calcium hydroxide) added. Corn is stirred to mix well with the alkaline suspension. The alkali rate used is from 0.75 to 1.0% based on corn.

After steeping water with excess alkali, steeping water or "nejayote" is eliminated. The corn hydrated by the process is washed, and after it is ground in a disks-mill, the disks being generally of stone and sometimes of stainless steel, adding supplementary water to ease the grinding and obtaining a corn dough with about 55% moisture. From that corn dough tortillas are made in equipment specially designed for this purpose, to stamp and cook the tortillas.

Tortillas are thin disks with a 1.5 to 2.0 mm thickness and 12 to 15 cm diameter, being cooked from 40 to 120 sec in a heating plate called "comal" with temperature ranges between 250° to 350° C. (Bressani, 1958, Agricultural and Food Chemistry (1958), volume 6, pages 770-778). Tortillas when not consumed minutes after being made, require reheating as it is used to consume them hot.

PHYSICAL-CHEMICAL CHANGES OCCURRING DURING LIME COOKING OF CORN

The modifications taking place in corn during lime cooking thereof were evaluated at a histochemical level by Vaqueiro (thesis of Maria Cristina Vaqueiro Garibay at the Sciences College, National Autonomous University of Mexico, 1969), and can be summarized as follows:

(1) The action of cooking corn in an alkaline medium solubilizes part of the hemicelluloses located in the hull of the corn kernel. Therefore, the cellulosic structure of this hull is defibrillated in such a way that when ending the lime cooking and during milling a hydrated system is formed in which these fiber elements participate providing the final product, the tortilla with particular rheological characteristics. To assist in the adequate generation of such properties, use of corn grinding machines that does not fragment the fiber elements is procured, as such result in that the referred tortillas lack the elasticity and resistance to bending, that consumers find indispensable in good quality products.

(2) Another change occurring during lime cooking of corn is a very incipient gelatinization of the starch granules located in the outermost layers of the kernel; the depth of this modification, as determined by histochemical studies, goes in the range from 5 microns in the traditional process to 40 or more microns in the industrial processes.

(3) Against what is commonly believed, lime (calcium hydroxide) which is the substance used for lime cooking of corn, does not penetrate the inside of the grain and its presence is restricted to the external part thereof, loosing part of this compound during the wash step of the lime cooked corn.

(4) Corn proteins are also altered, and although these do not influence that much the characteristics being of paramount interest in the manufacturing of tortillas, they affect the nutritional quality of the lime cooked corn and products thereof. One part of the proteins, those of the external zones of the corn kernel, located in the aleuronic and subaleuronic layers, is solubilized in the alkaline spent liquor resulting from the lime cooking of corn.

Other microscopic observations made in tortillas after being carried out its cooking in the plate (250°-350° C.) indicated that in this last step of the process the complete gelatinization of the corn starch takes place.

PREVIOUS PROCESSES FOR OBTAINING LIME COOKED CORN

Previous process for obtaining lime cooked corn were developed in two main areas: one focused to improve the stability of the final product, that is the tortilia, and the other oriented to produce an instant corn flour having a long shelf life, associated with the manufacture of tortillas with excellent quality and other advantages.

Dough and Tortillas-For the first alternative, the procedure reported by M. J. Rubio et. al. (U.S. Pat. No. 3,730,732) claims that the yield of the corn dough and tortillas is increased incorporating water soluble alkaline substances during corn dough preparation. Further, Rubio et. al. indicated that by adding soluble alkaline substances to the corn dough, the microbiological decay of tortillas (made from lime cooked corn or from instant corn flour) is prevented.

This type of methodology to improve the shelf life of tortillas does not resolve the problem of having a useful product for the manufacture thereof, which can be preserved during relatively prolonged time without being deteriorated as the only improvements are carried out upon the final product.

U.S. Pat. No. 3,083,103 to Anderson et. al. describe a procedure to obtain corn dough in which processing of the corn grain is carried out in the presence of an over saturated aqueous solution of calcium hydroxide and using a steam pressure from about 0.07 to 1.75 kg/cm², approximately from 0.6 to 5 minutes.

This procedure, evidently accelerated considerably the process of lime cooking of corn, but at the expense of affecting the hydrolytic process efficiency, taste and other properties of the corn dough, generating a product not suitable for tortilla manufacture but instead used in the production of fried and/or toasted products.

Flour—The second alternative mentioned provides better perspectives, as it is oriented toward production of lime cooked corn flour which may serve as an instant product for the manufacture of tortillas and other corn derivatives even after being stored for a relatively prolonged time without loosing its characteristics. Lime cooked corn flour provides numerous advantages with respect to the corn dough produced by the traditional method herein before described as is mentioned the following:

(a) It can be stored at room temperature for a prolonged time if and when relative humidity is not high.
(b) Production and distribution can be adjusted according to market demands.
(c) It is an homogeneous product.
(d) Hygienic conditions during manufacturing of corn flour are improved and are strictly regulated, with respect of those prevailing in the traditional process.
(e) If end products such as tortillas or some other derivatives is going to be used as vehicle for some other nutrients, these can be incorporated easily in the flour.

In the technical and scientific literature there are several different methods cited for the manufacture of lime cooked corn flour, one is the procedure for the accelerated lime cooking of corn (U.S. Pat. No. 2,584,893) developed in 1951 by the Instituto Mexicano de Investigationes Tecnologicas IMIT (Mexican Institute for Technological Research). This procedure comprises an accelerated lime cooking of the whole corn grain for a time of 45 to 60 minutes at a temperature close to the water boiling point, with a weight rate of corn to water of 1:2 and a calcium hydroxide concentration of 1.0% based on the amount of corn. The lime cooked corn grains, by means of this procedure, reach a moisture level of 40 to 45%. The lime cooked material is drained and washed, after which it is ground in an impact mill and dried in a flash drier to obtain a stable lime cooked corn flour.

F. Celorio (Mexican Patent 125,285) described a process and apparatus specifically designed for obtaining lime cooked corn flour, applying a dry method which comprises mixing a corn flour previously prepared with a suitable amount of lime and heating the mixture in a fluidized bed chamber so as to release the humidity of the corn flour particles producing a humid and hot atmosphere within the cooking chamber, enough to carry out the alkaline thermal treatment of the corn flour without adding an aqueous medium. However, it may be considered that this procedure provides defective results in view of the fact that a mixture of corn and lime as dry powders provokes a lack of homogeneity in the lime cooking operation with the consequent difficulties in the control of quality of the corn flour obtained by means of such procedure.

E. L. Wimmer et. al. (1968) U.S. Pat. No. 3,404,986 describe a method for flour manufacturing with intense corn flavor different from the flavor obtained with lime treatment and based essentially on regulating the moisture content of the wet flour passing it through heated rotating rollers set very tight to form flakes being milled thereafter to obtain corn flour. However, by not applying a lime cooking step in this process, that is a treatment with an alkaline solution, it can be considered as an inadequate procedure for the preparation of a corn dough for the manufacture of good quality tortillas, since the pericarp fibers of the whole corn grain are incorporated without any transformation, which may produce inadequate rheologic characteristics of the corn dough to form tortillas.

Another method reported for obtaining corn flour for tortilla manufacturing was proposed by Molina, et. al., J. of Food Science (1977), volume 42, pages 1432–1434, based on grinding the whole grain and mixing the flour those obtained with a 0.3% lime solution, in a weight rate of 3 to 1. The wet mixture is dried in a drum drier and thereafter the product is milled to obtain an instantaneous corn flour for the production of tortillas. With this procedure the lime cooking of the previously milled material cannot be properly regulated.

Bazua, et. al., J. of Food Science (1979), volume 44, pages 940–941 describe a procedure for the manufacture of lime cooked corn flour, also incorporating the milling of the whole grain, adding to the corn flour thus obtained a 0.2% by weight of calcium hydroxide, thereafter subjecting the product to an extrusion operation with water addition. The resulting product is a wet flour subjected to drying and final milling to obtain an instant flour for making tortillas. The probable gelatinization of the starch provoked by the extrusion of the product will produce bad quality tortillas.

U.S. Pat. No. 4,250,802 refers to a different procedure including preheating of the previously treated grains, spraying a lime water suspension to supply partially treated grains in a relatively dry state, which are passed through a mill for pulverization, after which the flour obtained by adding water forms a corn dough that is cooled and molded to generate the desired final product such as tortillas or flakes.

Vaqueiro and Reyes (1986) in U.S. Pat. No. 4,594,260 describe a fractionated lime cooking process based on a corn grain conditioning towards softening the hull to ease the separation in the subsequent grinding and sizing steps. The hull thus separated is submitted to an alkaline thermal treatment at a temperature between 85° to 90° C. for 15 to 30 minutes. The alkali concentration ranges from 0.4 to 1.0% based on the initial amount of corn. Once the lime cooking of the hull is finished, the "nejayote" is drained, washed with fresh water to eliminate lime excess and is mixed with the endosperm-germ fraction at a temperature of 70° to 75° C. The mixture thus obtained is ground in an impact mill and the resulting wet flour is dried in flash dryers. With this procedure the losses of fiber, proteins, fats, vitamins and minerals are reduced and not providing thermal damage starch which provides a flour which by being hydrated produces corn dough and tortillas with similar characteristics to those obtained with the traditional process.

From the prior paragraphs, it could be mentioned that all the reported procedures being to obtain corn dough or to obtain instant corn flour for tortilla and similar products manufacturing, resort in lime cooking under several grain conditions of the corn kernel, whole or milled and particularly introduces the concept of an accelerated lime cooking treatment of corn, producing a diversity of chemical and physical changes that in some cases generate considerable corn solids losses and/or changes in the constituents of the corn grain.

When lime cooking of corn is carried out in a flooded system, solid losses reach levels in the order of 5 to 14% mainly due to the solubilization of hemicelluloses, proteins and fats caused by the alkaline thermal treatment.

The compounds lost more frequently are fats present in the germ, crude fiber from the pericarp and protein nitrogen from the endosperm. The magnitude of these losses is variable, depending of the initial quality of the grain and the type of treatment applied.

BRIEF DESCRIPTION OF THE PROCESS

Considering the problem of environmental pollution that the lime cooked corn industry faces, both in the traditional scheme for the manufacture of corn dough and tortillas as in the industrial aspect for the elaboration of instant lime cooked corn flours, it is the purpose of the present invention to generate a short time/high temperature non-pollutant process to obtain lime precooked corn. The precooked corn is dried to produce a convenient product. After hydration of the dry lime precooked corn, the product can be used for the manufacture of corn dough and tortillas.

The short time/high temperature process provokes in the corn grain physical and chemical changes similar to those obtained by the traditional process of lime cooking and notably reduces and/or eliminates the losses of grain nutrients and the generation of pollutant effluents.

Because of the process conditions used, the physical and chemical changes affect as in the traditional process the outermost portions of the corn grain, represented by the hull or pericarp, limiting by the amount of water required for the process and for the short processing time the undesirable gelatinization of the starch is eliminated thus generating a corn dough with adequate characteristics for tortilla manufacturing.

One important purpose of this invention is in the reduction of the amount of water and lime used, which eliminates the need for washing the product after lime cooking, which situation contributes in an important way to reduce effluent production nutrient losses.

Another goal of the present invention is to stabilize the lime precooked corn by means of strictly regulated drying that will permit latter the total hydration of the grains for further transformation into corn dough and tortillas and for storage thereof at room temperature for prolonged periods without decay of any type.

Additionally, this process may also be used for the manufacture of packed tortillas which are produced by subjecting the lime precooked corn to direct hydration for 2 to 3 hours, grinding the hydrated corn in a stone disks mill to obtain the corn dough and from this the tortillas, which after being cooled can be packed in polyethylene bags.

The lime precooked corn also can be milled right after the cooking process in an impact mill to produced lime precooked corn flour that is dried in a flash drier.

BRIEF DESCRIPTION OF THE DRAWINGS

The novel facts of the present invention are defined specifically in the claims at the end of this document. However, the present invention regarding to its organization and operation method will be better understood by reading with reference to FIG. 1, which in a block diagram illustrates the process to obtain the lime precooked corn derivatives by the short time/high temperature process.

DETAILED DESCRIPTION

As a result of several investigations, experiments and laboratory tests, it has been determined that the lime cooking process causes a series of desirable changes in the corn grain so it may be transformed successfully into corn dough and tortillas.

The industrial processes to obtain lime cooked corn flour, provokes on one side, partial changes in the hull or pericarp structure not allowing the formation of the fiber hydrated system derived from this structure, necessary for obtaining corn dough and tortillas, with adequate rheological characteristics, and on the other side, the grain exposure for prolonged periods to an excess of water and to high temperature produces undesirable thermal damage to the corn starch and partial denaturalization of proteins, reflected in tortillas of regular quality notwithstanding in satisfactory manner, the reheating process generally applied for consumption.

Additionally, impact milling of the grain with lower moisture levels (in the order of 45%) than that obtained in the traditional process does not generate an adequate particle size distribution for obtaining products (corn dough and tortillas) with similar quality to that obtained with the traditional process.

On the other hand, the changes obtained with the traditional process considered as most desirable (hull or pericarp hydrolysis with consequent formation of the fiber system and homogeneous hydration of proteins and starch without undue gelatinization) requires lime excess, water excess, long reaction time (12 hours or more) and the need of a washing step of the lime cooked corn. The water excess resulting from the cooking and washing steps generates considerable volumes of an effluent or "nejayote" with an alkaline pH (10 or higher) and with a dry solids content in the order of 5 to 10%.

The following described process attempts to obtain, through an industrial process, the changes produced in corn kernels by the traditional process, in a time period between 20 minutes and 60 minutes, in a system in which process water represent 35 to 80% of corn grain, the lime concentration is in the order of 0.4 to 0.9 based on the grain to generate an initial pH of 11.5 to 12.5. During the heating step temperature rises from 15° C. to 100° C. at a rate of 1.5° to 6° C. per minute. Once the lime cooking temperature is reached, the cooking temperature is kept at a temperature not over 100° C. for a period of 5 to 20 minutes. At the end of the lime cooking step, the grain is ready for drying and transformation into DRY LIME PRECOOKED CORN, or hydrated by a period of 2 to 3 hours, with a corn:water ratio of 1:0.6 to 1.0:1.0 at a temperature from 20° to 70° C. for further milling in stone disks mill and transformed into corn dough and tortillas, or transformed into lime cooked corn flour by impact milling and further drying. Following is described in a detailed form each one of the main steps of the process.

CORN—Main raw material of this process is white dented corn with a minimum of 30% of horny endosperm. The grain is characterized for quality parameters as moisture, bulk density, foreign material, size and physical and microbiological damage.

CLEANING—The corn grain is dry-cleaned by mechanic and pneumatic means thereto sieves and extractors for the elimination of dust, metals, stones, foreign seeds and any type of undesirable material for the process.

DOSING AND LOADING—Once cleaned the corn is weighed in electronic type scales, dosing the exact amount of corn and water required for the process. Corn and water are mixed at a rate of 1.0:0.35 to 1.0:0.65 and being unloaded by a mobile platform directly in the cooking vessels that are semi-cylindrical shaped pressurized containers with a direct steam injection system and internal dividing walls. They count with a mechanism allowing rotation thereof at a predetermined speed between 0.33 to 1.0 r.p.m., thus easing the mixing of the process components and the even distribution of steam. Additionally, the internal dividing walls contribute to exert a mechanical effect contributing to accelerate the changes needed at the pericarp level.

LIME SUSPENSION PREPARATION—Lime is the alkaline agent responsible to provide in combination with time and temperature the changes occurring due to the lime cooking of corn. Because of the high insolubility of this compound, in order for its effect to be suitable, it must be added in excess. The over saturated lime suspension is prepared by mixing 0.4 to 0.9% of alkali (corn basis) in water at a lime:water ratio of 1.0:6.25. Lime suspension pH should be between 11.5 to 12.5. The suspension must be prepared in suitable vessels (plastic or stainless steel) with vigorous mechanical agitation and immediately added to the cooking vessel already loaded with corn and water. The water used to prepare the lime suspension being part of the total water required for the lime cooking of corn.

MIXING—Once loaded with corn, water and lime, the cooking vessel is tightly closed and the mixing operation is started with the purpose to homogenize the load, operating the automatic rotating system of the cooking vessel at a speed of 1 rpm for a period of 1 to 10 min. This process step is carried out at a temperature between 15° and 35° C. Mixture pH should be in the range of 11.0 to 12.0 and grain color turns from white to bright yellow, evenly.

HEATING—Lime cooking process starts applying heat through direct steam injection in a controlled manner to increase the temperature of the cooking vessel from 15°–35° C. to the required point to lime cooking of corn that has been set between 85° to 100° C. Depending of the load of the cooking vessel, the steam pressure during heating is handled at a range from 0.8 to 1.8 Kg/cm$^2$. The heating rate is one of the most important factors to reach an adequate lime cooking of corn, since during this step because of the gradual increase of temperature and the alkaline pH the hydration of the hull or pericarp is regulated thus being prepared for the hydrolytic process that takes place during the lime cooking step. The heating rate should be carefully regulated at a temperature increase of 1.5° to 6.0° C. The even distribution of heat is reached by preset rotation of the cooking vessel at a rate between 0.33 to 1.0 r.p.m.

LIME COOKING—Lime cooking should be carried out at a suitable temperature and for a defined period of time in order to generate the structural and chemical changes at the pericarp level and endosperm and germ water absorption is limited. This is done by keeping the cooking vessel temperature in a range no less than 85° C. and not over 100° C. The cooking temperature depending of the cooking load is kept at the desired range maintaining a steam pressure between 0.3 to 0.9 Kg/cm$^2$. The cooking time to reach a suitable lime cooking of corn should be between 5 and 30 minutes. The cooking step should be carefully controlled to avoid as possible an overcooking of the external part of the grain, being reflected in undesirable starch gelatinization. In this step the movement of the cooking vessel must be restricted to a speed between 0 to 0.66 r.p.m. so as not to induce excessive mechanical damage causing the release of the pericarp of the grain that will produce problems during the unloading of the cooking vessel and further drying.

DEPRESSURING—System depressuring is carried out by closing the steam valve and opening the bleeding valve. This operation must be done in a period of time between 4 to 10 minutes to avoid over cooking of the grain.

UNLOAD AND TRANSPORTATION—Once the cooking vessel is depressurized the unloading of the grain is carried out automatically by letting the lime cooked grain fall over a sanitary conveyor guiding the grain to a transportation system leading the product to the feeding hopper of the dryer.

DRYING—Drying of lime cooked corn, with an initial moisture content between 35 and 42%, is carried out in a multiple belt with an air flow of 30 to 50 m/minute, passing to a product bed with a depth between 2 to 9 cm. The drying air temperature should be between 85° and 150° C., and to avoid thermal damage to the germ and endosperm that of the product should not be over 70° C. at any time. The drying time should be enough to get a 12 to 14% moisture content in the dry product and will depend on the initial air temperature and humidity of the grain, but it must be pointed out that it will be between 15 and 75 minutes. At the end of drying the product is cooled and temperate to equilibrate the moisture content in each grain and between grains.

PACKING—The product already cold can be stored in bulk or packed in 25 to 50 Kg polyethylene bags or Kraft paper bags.

STORAGE—The already packed product is stored in platforms in dry and cool warehouses. The shelf life of the dry lime pre-cooked corn is at least of six months.

For later use the thus obtained product of this process is hydrated in an alkaline aqueous medium at a rate dry corn:water of 1.0:1.1 at a temperature between 20° and 50° C. for a period of 12 to 16 hours to reach a moisture level between 48 to 52% suitable to be milled and transformed in corn dough and tortillas.

Additionally with this process corn dough and tortillas also can be obtained by means of hydration, during 3 to 4 hours of the lime cooked grain before being dried, at a corn:water ratio of 1.0:0.5 to 1.0:0.7 and at a temperature between 30° and 70° C. The hydrated grain can be milled in stone disks mills and transformed into corn dough and tortillas, the later for marketing as packed tortillas.

Also the lime cooked grain can be transformed into flour using thereto hammer or pin mills suitably adapted with convenient sieves to generate a product with a particle size distribution such that over 80% passes through a U.S. standard sieve number 60. The wet flour (30–35% moisture) is passed through a flash dryer to reduce the moisture to 10–12%. The product temperature during drying should not be over 70° C.

Dry flour is passed through a sieve system to ensure the final product particle size distribution by recycling to the mill the flour not meeting the granulometry specifications.

Product of this process line is packed in 1-2 Kg individual packages or in 25 Kg Kraft paper bags. Flour already packed is stored in dry and fresh warehouses.

We claim:

1. A process for obtaining a dry lime pre-cooked corn grain, stable for storage at room temperature consisting essentially of
   (a) mixing corn and water in a pressurized container at a temperature of 15° to 35° C. to form a corn-water mixture,
   (b) adding an aqueous lime solution to said corn-water mixture to form a corn-water-lime mixture having a pH of 11 to 12,
   (c) heating, by adding steam, said corn-water-lime mixture at a rate of 1.5° to 6° per minute until a lime cooking temperature of said corn-water-lime mixture is reached,
   (d) lime cooking said corn-water-lime mixture at a lime cooking temperature of at least 85° to no more than 100° C. for 5 to 20 minutes to form lime pre-cooked corn and depressuring said container over a period of 4 to 10 minutes, and
      (i) drying said lime pre-cooked corn wherein the temperature of said lime pre-cooked corn is less than or equal to 70° C. and optionally packing said lime pre-cooked corn,
      (ii) hydrating said lime pre-cooked corn within 3 to 4 hours of step (d) by adding water to said lime-precooked corn at a corn:water ratio of 1:0.5 to 1:0.7 at a temperature of 20° to 70° C., or
      (iii) milling said lime pre-cooked corn to form flour and drying said flour wherein the temperature of said flour is less than or equal to 70° C.

2. The process according to claim 1, consisting essentially of mixing corn and water in a ratio of 1:0.35 to 1:0.65 in step (a).

3. The process according to claim 1, wherein said corn-water mixture in step (a) is rotated at a speed of 0.33 to 1 rpm.

4. The process according to claim 1, wherein said aqueous lime solution has a pH of 11.5 to 12.5.

5. The process according to claim 1, wherein said aqueous lime solution is prepared by mixing 0.4 to 0.9% of lime based on said corn in water at a lime:water ratio of 1:6.25.

6. The process according to claim 1, wherein said corn-water-lime mixture in step (b) is rotated at a speed of 1 rpm for 1 to 10 minutes.

7. The process according to claim 1, wherein said steam in step (c) has a pressure of 0.8 to 1.8 kg/cm$^2$.

8. The process according to claim 1, wherein said corn-water-lime mixture in step (c) is rotated at a speed of 0.33 to 1 rpm.

9. The process according to claim 1, wherein said corn-water-lime mixture in step (d) is rotated at a speed of 0 to 0.66 rpm.

10. The process according to claim 1, wherein said lime cooking temperature in step (d) is maintained by a steam pressure of 0.3 to 0.9 kg/cm$^2$.

11. The process according to claim 1, wherein said lime pre-cooked corn has a moisture content of 35 to 42%.

12. The process according to claim 1, wherein the resulting moisture content in (i) is 12 to 14%.

13. The process according to claim 1, wherein said hydrating in (ii) lasts for 2 to 3 hours.

14. The process according to claim 1, wherein the resulting moisture content in (ii) is 45 to 47%.

15. The process according to claim 1, wherein said flour in (iii) has a moisture content after said drying of 10 to 12%.

16. The process according to claim 1, wherein said drying in step (i) is conducted at 85° to 150° C.

* * * * *

UNITED STATES PATENT AND TRADEMARK OFFICE
CERTIFICATE OF CORRECTION

PATENT NO. : 5,447,742
DATED      : September 5, 1995
INVENTOR(S): Oscar Fernandez-Malvido & Arturo Fernandez-Malvido It is certified that error appears in the above-indentified patent and that said Letters Patent is hereby corrected as shown below:

On the title page, insert
item [76] Oscar Fernandez-Malvido and Arturo Fernandez-Malvido Signed and Sealed this Twentieth Day of February, 1996

Attest:

BRUCE LEHMAN

Attesting Officer

Commissioner of Patents and Trademarks